April 20, 1954 B. M. COLE 2,676,201

COLOR PHASE SYNCHRONIZATION SYSTEM FOR TELEVISION

Filed June 18, 1951 2 Sheets-Sheet 1

INVENTOR.
BYRON M. COLE
BY Elwood J Kendrick
Attorney

April 20, 1954 B. M. COLE 2,676,201

COLOR PHASE SYNCHRONIZATION SYSTEM FOR TELEVISION

Filed June 18, 1951 2 Sheets-Sheet 2

INVENTOR.
BYRON M. COLE
BY Elwood J. Kendrick
Attorney

Patented Apr. 20, 1954 2,676,201

UNITED STATES PATENT OFFICE 2,676,201

COLOR PHASE SYNCHRONIZATION SYSTEM FOR TELEVISION

Byron M. Cole, Los Angeles, Calif., assignor to Packard-Bell Company, Los Angeles, Calif., a corporation of California Application June 18, 1951, Serial No. 232,109

7 Claims. (Cl. 178—5.4)

This invention relates to television with particular reference to television systems of the sequential type and is directed to the problem of synchronizing the color sequence at the receiving station with the color sequence at the transmitting station.

In a sequential television color system, a series of images is transmitted in a color cycle, for example a color cycle of primary colors in the sequence of red, blue and green. The successive images of the color cycle may be complete image fields or fragments of image fields or may be field scansions in which each scansion of the color cycle is interlaced with the succeeding scansion to complete an image field. Since interlaced scanning, as developed by the Columbia Broadcasting System and commonly known as the CBS Color System, is highly favored at present, the invention will be described herein, for the purpose of disclosure and illustration, as applied to the problem of color synchronization in such a system. It will be readily apparent to those skilled in the art, however, that the invention is applicable to any type of sequential system as well as to other situations where the same basic synchronization problem arises.

Although the color cycle may be created in different ways and new methods will be developed with the passage of time, at present the color cycle in the CBS system is carried out by movement of a filter means in the form of either a disc or a drum. Such a filter means has at least one set of three filter elements corresponding to the three primary colors.

The problem is not merely synchronization in the usual sense of identical rates of operation or simultaneity of images, since the color cycle at the receiving station may match the speed of repetition of the color cycle at the transmitter station with image changes simultaneous with color changes and yet fail of purpose by being out of phase with the transmitted cycle. Thus an image of the red phase of the transmitted cycle may fall in the blue phase of the color cycle generated at the receiving station, synchronization being correct in all other respects.

The general object of the present invention is to achieve completely automatic color phase synchronization in a television system. A composite television wave pattern necessarily includes vertical and horizontal sweep synchronization signals along with the video signals and since these two kinds of synchronizing signals are repeated a number of times in each color cycle the problem is to add a third less frequent synchronizing signal that may be detected at the receiving station for the purpose of color control.

Various solutions have been suggested for this problem of providing and detecting a signal representing a selected control point in the color cycle. One such suggestion, for example, is to increase the amplitude of the composite television signal to a maximum at the selected point. A special object of the present invention, however, is to achieve simplicity and avoid complications by developing the desired color phase control signal within the amplitude and within the present scope of the conventional composite television signal.

In general this object is attained by introducing at least one color synchronizing signal among the conventional sweep synchronizing signals at the selected point in the color cycle thereby to create increased frequency in the sequence of synchronizing signals at the selected point. This point of maximum frequency is detected at the receiving station and used to control the reproduced color cycle in phase synchronism with the transmitted color cycle.

The various features and advantages of the invention will be understood from the following detailed description taken with the accompanying drawings.

In the drawings, which are to be regarded as merely illustrative,

*General concept*

In a television receiver the sync separation circuits remove the synchronizing pulses from the composite television signal after intermediate-frequency amplification and demodulation. The wave forms of the separated train of sync pulses in conventional television practice is shown in Fig. 2*a* where the vertical pulses V and the associated two groups of equalizing pulses E are shown for the vertical blanking period between two phases in the transmitted color cycle. The two phases are the blue field represented by the horizontal sync pulses H on the left and the green field represented by the horizontal sync pulses H on the right.

In the present invention it is contemplated that at least one additional sync pulse, similar to the other sync pulses and of the same amplitude, will be inserted in this train of sync pulses to create a selected point or narrow region of stepped-up frequency as a reference point or control point in the color cycle. The complete color cycle consists of three successive series of the pulses H separated by groups of vertical sync pulses V and equalizing sync pulses E as shown and the newly added signal or signals for color phase synchronization may be inserted at any point in the overall color cycle.

Figures 1, 2:
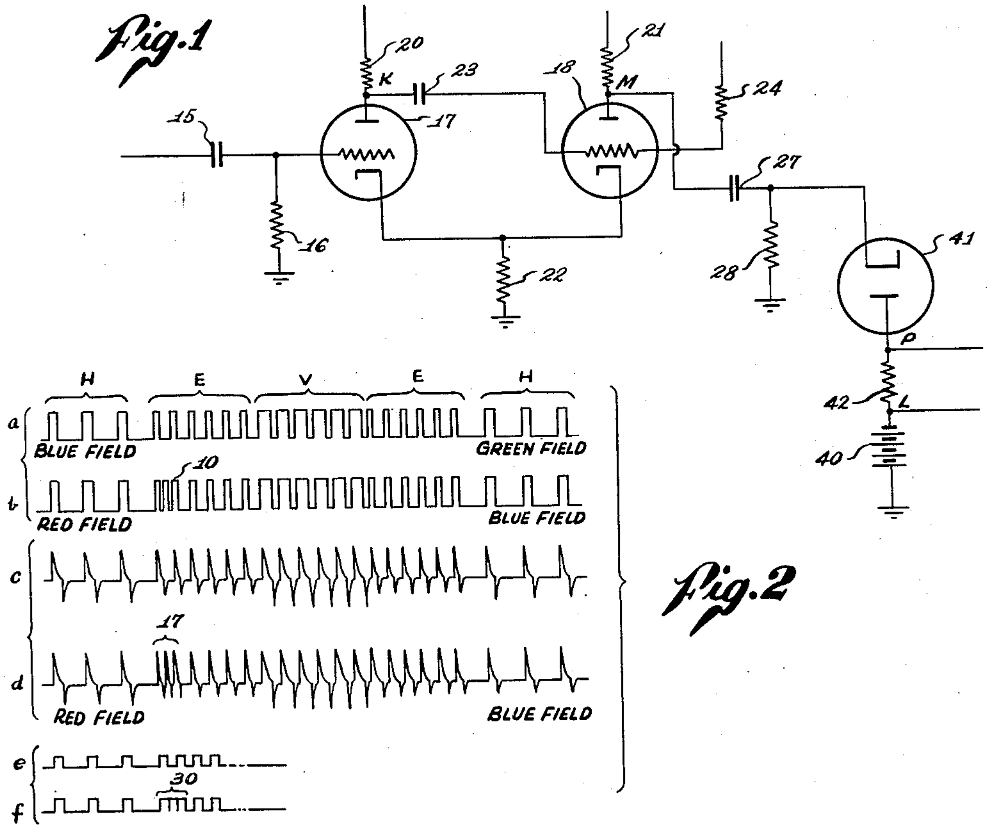
Fig. 1 is a diagram illustrating a specific circuit for detecting and isolating the color phase synchronizing signal in a preferred practice of the invention.
Figs. 2 and 3 are diagrams of wave forms for explaining the operation of the circuit in Fig. 1.

In the present preferred practice of the invention the selected control point is associated with the red field or red phase of the color cycle and is in a group of equalizing sync pulses E either immediately before or immediately after the horizontal sync pulses H of the red phase. By way of example, Fig. 2 shows an additional sync pulse 10 interposed between the two equalizing sync pulses E immediately following the horizontal sync pulses H of the red phase of the signal cycle. Preferably, as shown, the newly added sync pulse 10 is similar in configuration and amplitude to the equalizing sync pulses.

It is apparent that the inserted signal 10 creates a point or restricted region of maximum frequency since the three sync pulses grouped together in this way occur in more rapid succession than any other three sync pulses in the whole color cycle. Usually a group of only three high frequency signals is necessary to carry out the purpose of the invention but if a longer series of the high frequency signals is desirable, a second color phase sync pulse may be inserted between the next two succeeding equalizing sync pulses E to form an extended group of five high frequency pulses.

The selected reference or control point of increased frequency in the color cycle may be detected in various ways in various practices of the invention. For example, as will be explained, the train of sync pulses shown in Figs. 2*a* and 2*b* may be used to trigger voltage responses that are of greater time duration than the time interval between the high frequency signals but less than the time intervals between the other sync pulses in the color cycle. Thus in the CBS system where the time interval between the equalizing sync pulses E measured from the beginning of one signal to the beginning of the next succeeding signal is 17.1 micro seconds, the sync pulses may be used to trigger voltage responses on the order of 17.1 micro seconds duration. Since the time spacing of the three high frequency signals is half as long as the duration of the triggered voltage responses, the voltage responses detect the high frequency signals by overlapping to create an accumulated voltage peak and the peak of the accumulated voltage response may be clipped to produce a single color phase sync signal at the receiving station corresponding to the color phase sync signal 10 inserted at the transmitter.

In the preferred practice of the invention I take two further steps before using prolonged voltage responses to detect the high frequency signals. The first of the two steps is to remove the duration of width distinction among the received sync pulses to simplify the detection of the point of increased or maximum frequency in the cycle. Such elimination is accomplished by feeding the squared sync pulses of Figs. 2*a* and 2*b* into a suitable differentiating circuit to obtain a corresponding output of voltage pulses or voltage pips as shown in Fig. 2*c* corresponding to Fig. 2*a* and in Fig. 2*d* corresponding to Fig. 2*b*. The second step in preparation for detection is to convert the voltage pips into uniformly prolonged or widened pulses such as indicated in Fig. 2*e* and 2*f*, which correspond respectively to Fig. 2*c* and Fig. 2*d*.

It can be seen that the first reduces the sync pulses to uniformity and the second step of uniformly widening the pulses has a certain selective effect in the region of the high frequency pulses since the increase in pulse width may be such as to completely eliminate the time gaps between the high frequency pulses and yet leave substantial time gaps between all the other sync pulses in the color cycle. Preferably, as indicated in Fig. 2*f*, the pulses are widened sufficient to almost, but not quite, cause the high frequency signals to merge together. If desired, the pulses can be even wider to cause the high frequency signals to merge together but it is preferred to maintain slight gaps in the high frequency region.

*Operation of the circuit in Fig. 1*

Figure 3:
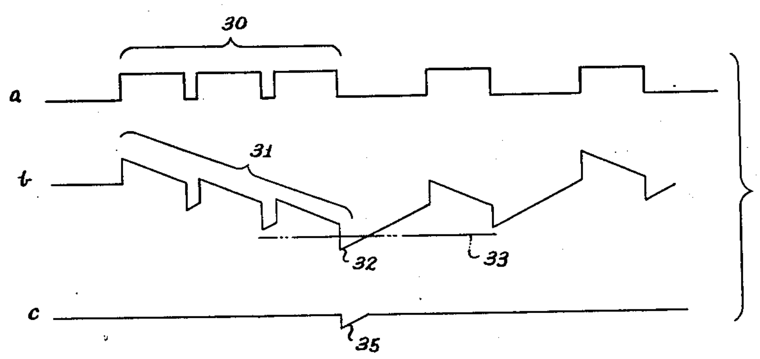

Fig. 1, by way of example, shows an arrangement that may be used to carry the train of sync pulses represented by Fig. 2*a* and Fig. 2*b* through the following four steps of the preferred practice of the invention. The first step is to convert the sync pulses into the voltage pips shown in Figs. 2*c* and 2*b*. The second step is to convert the voltage into squared pulses of uniform width represented by Fig. 2*e* and Fig. 2*f*. The third step is to build up an accumulative voltage response to the crowded squared pulses as indicated in Fig. 3*b*. The fourth step is to clip the accumulated voltage response to produce a single color phase sync signal such as shown in Fig. 3*c*.

The first step of converting the sync pulses of Fig. 2*a* and Fig. 2*b* into the voltage pips of Fig. 2*c* and Fig. 2*d* is accomplished by a first differentiating network in Fig. 1 comprising a condenser 15 and a resistance 16. In the present application of the invention to the CBS color system this differentiating network has a time constant on the order of one micro second. It will be noted in Fig. 2*e* that the previous insertion of the color phase sync pulse 10 of Fig. 2*b* creates a group of three closely spaced or high frequency pulses, the three pulses being indicated at 17 in Fig. 2*d*.

The second step of converting the sync pulses or voltage pips into the train of uniformly widened squared pulses of Fig. 2*e* and Fig. 2*f* may be carried out by any suitable means such as a multivibrator circuit or any other type of triggered generator such as a blocking oscillator. For this purpose Fig. 1 incorporates a multivibrator circuit including two triode vacuum tubes 17 and 18 with the grid of tube 17 connected as shown to receive the output from the described first differentiating network. The anodes of tubes 17 and 18 are connected to resistances 20 and 21, respectively, and the two cathodes are connected to ground through a common resistance 22. The anode of tube 17 is connected to the grid of tube 18 through a condenser 23 and the grid of tube 18 is connected in turn to a resistance 24.

Normally tube 18 conducts since its grid is tied to plus voltage. Voltage developed across the common cathode resistor 22 keeps tube 17 cut off unless its grid voltage is made positive by a positive voltage pulse from the initial differentiating network. When a positive voltage pulse arrives at the grid of tube 17 it starts to conduct and the resulting plate current causes the voltage at point K to go in a negative direction. This drop in voltage at point K causes current to flow through condenser 23 and resistance 24 thereby making the grid side of resistance 24 go negative to cut off conduction through tube 18. Since the current flowing through the resistance 24 and the grid of tube 18 charges the condenser 23, this current flow is progressively reduced as the condenser reaches full charge and therefore the grid side of resistance 24 becomes less and less positive.

After the initiating pulse has decayed to an ineffective value and after a period of time determined by the values of condenser 23, resistance 20, resistance 24, the supply voltage and the tube characteristics, the grid side of resistance 24 becomes sufficiently less negative to cause tube 18 to start conducting slightly. The resulting current from tube 18 through the cathode resistance 22 makes the cathode of tube 17 more positive thereby reducing the current flow through tube 17. This reduction of flow through the tube 17 couples a positive voltage through condenser 23 back to tube 18 making the grid of tube 18 even more positive and thus completes the cycle by cutting off tube 17 and establishing full current flow through tube 18.

It is apparent that the above-mentioned values are the factors that determine the uniform width of the pulses created by the desired multivibrator action. The period of conduction of tube 17 should be adjusted to something less than one-half the time interval between the equalizing sync pulses E. Thus for the CBS color system in which the period between equalizing sync pulses is 17.1 micro seconds, the period of conduction of tube 17 may be approximately 8 micro seconds.

The output from the multivibrator circuit for carrying out the next step may be taken at any of the electrodes of the two tubes 17 and 18 and various procedures known to the art can be utilized to produce the desired ultimate color phase sync signal, including integration, pulse counter-technique, delayed gating circuits and the like.

In the present arrangement the output from the multivibrator circuit is taken at the point M on the anode side of the tube 18 and is fed to a second differentiating network comprising a condenser 27 and a resistance 28. The time constant of this second differentiating network should be approximately equal to the interval between the equalizing sync pulse E. For example, the time constant for the CBS color system may be approximately 18 micro seconds.

The wave form at point M on the input side of the second differentiating network is shown in Fig. 2*e* and Fig. 2*f* and is shown on a greatly enlarged scale in Fig. 3*a*. It will be noted that the three closely grouped voltage pulses 17 of Fig. 2*d* have been converted into a group of three closely grouped squared pulses 30 in Fig. 2*f* and Fig. 3*a*. The corresponding output of the second differentiating network comprising the condenser 27 and the resistance 28 is indicated in Fig. 3*b*. It can be seen that the accumulative overlapping effect of the voltage pulses of the second differentiating circuit in response to triggering by the three crowded pulses 30 results in a three-part composite wave form designated 31 having an inverted peak 32.

It is apparent that clipping the output of the second differentiating circuit at a suitable level such as a level indicated at 33 in Fig. 3*b* will produce a color phase sync signal such as indicated at 35 in Fig. 3*c* and that this signal will occur just once in each color cycle at the predetermined point selected for color phase control at the receiving station.

Various circuit arrangements may be employed to clip or otherwise derive the signal 35 or the equivalent from the output of the above-mentioned second differentiating network. By way of example Fig. 1 shows a uni-directional device that may be used in combination with a suitable battery 40. The uni-directional device is in the form of a diode vacuum tube 41 with the cathode of the tube connected to the second differentiating circuit as shown and with the anode connected to the battery 40 through a suitable resistance 42. The clipping level is determined by the voltage at L in Fig. 1 and the resultant color phase sync signal is the output at point P.

*Using the signal for automatic color phase synchronization*

Preferably the present invention as described to this point is employed for fully automatic color phase synchronization without requiring manual manipulation. The manner in which the negative color phase sync pulse 35 of Fig. 3*c* derived by the above-described procedure may be used for automatic color phase synchronization is well understood in the art. For example, the Goldmark Patent 2,323,905 issued July 13, 1943, teaches how a synchronizing control signal originating at the television transmitter may be fed to a phase comparing circuit along with a local synchronizing wave generated at the corresponding point in the reproduced color cycle. The phase comparing circuit controls a synchronizing brake associated with a motor that drives the rotating filter means for creating the reproduced color cycle, the local sign wave being created automatically at the proper point in each of the color cycles. A completely automatic system with respect to color phase synchronization is shown in the Chambers Patent 2,319,789 issued May 25, 1943. In the latter disclosure the phase comparing circuit controls a phonic motor that is used to obtain synchronous rotation of a filter means driven by an asynchronous motor.

In view of these prior art teachings it is not believed necessary to describe in detail means required to utilize the color phase sync pulse 35 for completely automatic control of the color cycle reproduced at the television receiver.

Figures 4, 5:
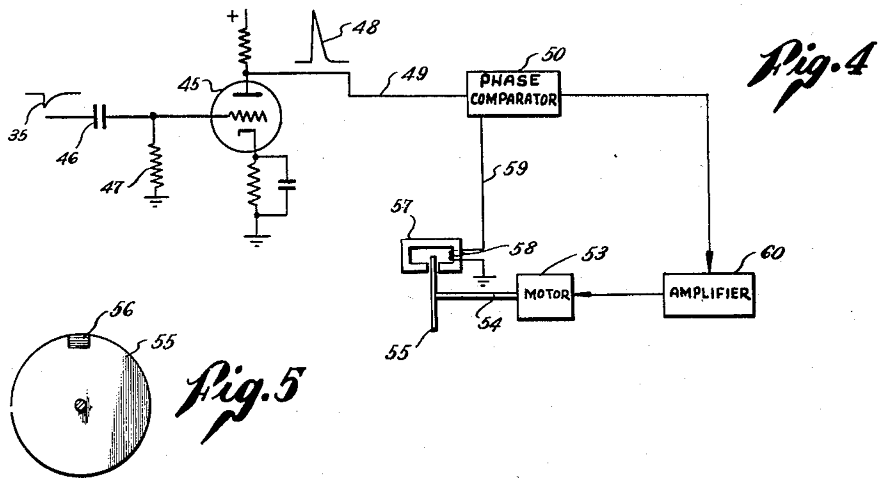
Fig. 4 is a diagram of a suggested arrangement for using the detected signal for automatic control of the color cycle at the receiving station.
Fig. 5 is a face view of a disc used for generating local phasing signals in the arrangement shown in Fig. 4.

Fig. 4 shows in a general way the essential elements of an arrangement that may be employed for automatic color phase control in the receiver. The negative color phase sync pulse 35 is fed to the grid of a triode vacuum tube 45 through a network comprising a condenser 46 and a resistance 47 to produce a corresponding amplified positive pulse indicated at 48. The positive pulse 48 is carried by a wire 49 to a phase comparator or phase comparing circuit 50. The motor means or combined motors indicated at 53 drives a shaft 54 carrying a filter means in the form of a disc 55 having the required filter elements (not shown) corresponding to three primary colors for reproducing the color cycle in the receiver.

The disc 55 may not only carry the required filter element but also may serve as one of the moving parts of a local phasing signal generator. To serve this purpose the disc 55 is made of non-magnetic material such as brass and carries a slug 56 (Fig. 5) of magnetic material such as iron on its periphery to pass through a gap in a stationary iron core 57. The iron core 57 has a winding 58 one end of which is connected to the phase comparator 50 by a wire 59. If the disc 55 carries more than one set of three filter elements corresponding to the three primary colors there will be a corresponding number of slugs 56 on the disc to generate one phasing pulse for each reproduced color cycle, the phasing pulse being at the same point in the reproduced color cycle as a point represented by the color phase sync pulse 48 derived from the color cycle at the transmitter.

The phase comparator 50 operating through an amplifier 60, automatically controls the motor means 53 in such manner as to continuously synchronize the locally generated color phasing pulse with the color phase sync pulse received from the transmitter and thereby accurately maintains the color cycle reproduced at the receiver in accurate color phase synchronism with the color cycle at the transmitter of the system.

Figure 6:
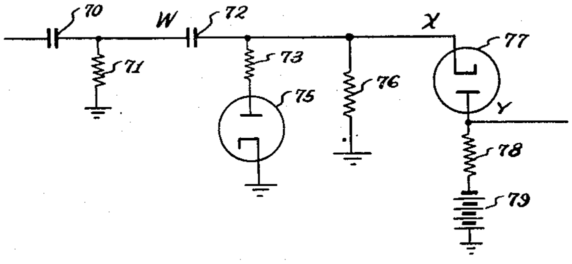
Fig. 6 is a diagram of an alternate form of circuit that may be used for detecting and isolating the color phase synchronizing signal at the receiving station.

*Description of alternate circuit in Fig. 6*

The circuit shown in Fig. 6 serves the same general purpose as Fig. 1 in detecting color phase sync pulse in the train of sync pulses shown in Fig. 2*a* and Fig. 2*b*. In this alternate practice of the invention, however, the intermediate step of creating the uniformly squared sync pulses of Fig. 2*e* and Fig. 2*f* is omitted.

The first part of the circuit shown in Fig. 6 is a combination of a condenser 70 and a resistance 71 comprising a differentiating network corresponding to the first differentiating network of Fig. 1.

The second part of the circuit in Fig. 6 includes a condenser 72, a resistance 73 connected to the anode of a diode vacuum tube 75 and a resistance 76 that is in parallel with resistance 73 and tube 75.

The third part of the circuit comprises a unidirectional device in the form of a diode vacuum tube 77 in series with a resistance 78 and a battery 79, these three elements corresponding to the same elements at the end of the circuit in Fig. 1.

Figure 7:
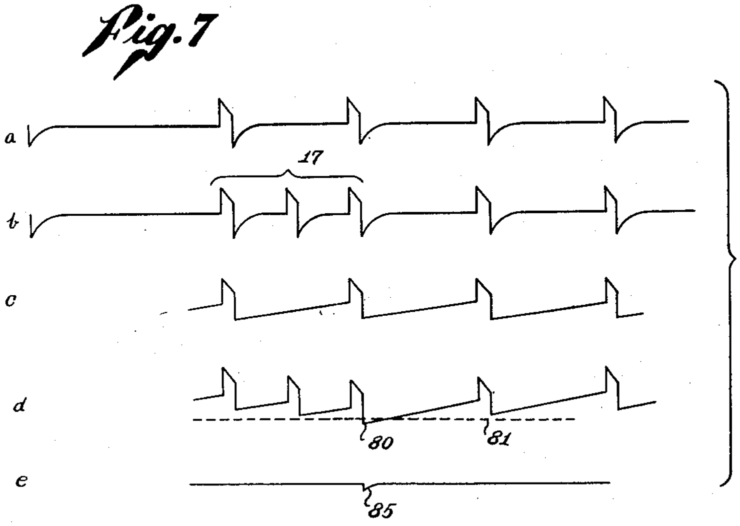
Fig. 7 is a diagram of wave forms to explain the operation of the circuit in Fig. 6.

The differentiating network comprising the condenser 70 and the resistance 71 received the sync pulses of Fig. 2*a* and Fig. 2*b* to produce as an output at the point W the voltage peaks of Figs. 2*c* and 2*d*. Fig. 7*a* and Fig. 7*b* represent the same pulses or pips as shown in Fig. 2*c* and 2*d*, but for the purpose of explaining Fig. 6 these pulses are shown on a greatly magnified time scale in Fig. 7*a* and Fig. 7*b*. The pulses shown in Fig. 7*a* are in the region of the equalizing sync pulses E of Fig. 2*a* and the pulses shown in Fig. 7*b* are in the same region but includes the group of three high-frequency signals 17 of Fig. 2*d* created by the introduction of the previously mentioned color sync pulse 10 of Fig. 2*b*.

The time constant of condenser 72 together with the parallel combination of resistance 73 and resistance 76 is approximately equal to the width of the equalizing pulses in Fig. 2*a* and Fig. 2*b*, which is 1.37 micro seconds for the CBS color system. The time constant of condenser 72 and resistance 76 is made approximately equal to the interval between the equalizing pulses E which is 17.1 micro seconds for the CBS color system. The resistance 71 should, of course, be relatively small. Any actual resistance by the diode 75 is considered as included in the value of resistance 73.

When point W in Fig. 6 goes positive, condenser 72 charges towards this plus value through resistance 73 and resistance 76 in parallel. Since the plate of diode 75 is positive, the diode conducts and may be considered as having zero resistance. At the completion of the positive pulse at point W, condenser 72 is charged to some positive value. The voltage then goes negative and condenser 72 discharges through resistance 76. With the plate of diode 75 becoming negative the resistance of the diode becomes extremely high. Since resistance 76 is much larger than the resistance of the parallel combination of resistance 73 and resistance 76 it takes condenser 72 much longer to discharge than to charge. This prolonged discharge period of the condenser 72 is apparent in the waveform shown in Fig. 7*c* which waveform represents the pulses at the point X in Fig. 6.

The prolonged discharge period of the condenser 72 makes this arrangement selectively responsive to the introduction of the color sync pulse 10 by an accumulative effect as heretofore explained. The accumulative effect is apparent in Fig. 7*d* and it can be seen that the high frequency group of pulses 17 results in a negative voltage peak 80 occuring at the selected control point of the color cycle. Clipping the inverted voltage peak at the level 81 will produce the desired color sync pulse shown at 85 in Fig. 7*e* corresponding to the pulse 35 of Fig. 3*c*.

The clipping action to produce the signal 85 is accomplished in Fig. 6 by the combination of the diode tube 77, resistance 78 and battery 79 in the manner heretofore described with reference to Fig. 1. The output in the form of the color sync signal 85 is taken at the point Y in Fig. 6 and employed for automatic color phase synchronization at the receiver in the manner heretofore described.

My disclosure of specific arrangements for carrying out the presently preferred practice of the invention will suggest to those skilled in the art various changes, modifications and substitutions that lie within the scope and spirit of the appended claims.

Having described my invention, I claim:

1. A receiver for a color television system in which system at least one color phase signal is inserted among the normal equalizing signals to produce a crowded group of signals at a desired color synchronizing point in the color cycle, said receiver having: a normally nonconducting unidirectional current conducting means adapted to conduct in response to a potential thereacross above a predetermined threshold value; means to convert said equalizing signals and the inserted signals into voltage pulses of a duration not substantially greater than the order of magnitude of the interval between the initiation of two successive normal equalizing signals but greater than the time interval between the initiation of successive signals in said group of signals;

and means to apply said voltage pulses to said unidirectional means whereby said converting means responds selectively to said group of signals by cumulative rise in voltage above said threshhold value thereby to cause current flow in said unidirectional device for the creation of a color synchronizing signal.

2. A combination as set forth in claim 1 in which said unidirectional means is a diode.

3. A combination as set forth in claim 1 which includes means to apply a voltage to said unidirectional means opposite in polarity from said voltage pulses to at least in part fix said threshhold value.

4. A combination as set forth in claim 3 in which said unidirectional means is a diode.

5. A combination as set forth in claim 1 in which said converting means comprises: a first differentiating circuit to produce voltage pips; means responsive to said voltage pips to produce squared pulses the duration of which is on the order of the time interval between the initiation of successive signals in said group of signals; and a second differentiating circuit responsive to said squared pulses, said second differentiating circuit having a time constant on the order of the interval between the initiation of successive normal equalizing signals.

6. A combination as set forth in claim 1 in which said converting means comprises: a differentiating circuit to produce voltage pips; a capacitor coupling said circuit with said unidirectional means; a first resistance connected between said capacitor and said unidirectional means, said first resistance being in parallel with said unidirectional means; and a second resistance together with a second unidirectional means in series therewith, said second resistance and second unidirectional means being connected between said capacitor and said first unidirectional means also in parallel with said first unidirectional means, the time constant of said capacitor and said first resistance being on the order of magnitude of the time interval between the initiation of successive normal equalizing signals.

7. A combination as set forth in claim 6 in which the time constant of said capacitor together with both of said resistances is on the order or magnitude of the duration of the individual equalizing signals.

References Cited in the file of this patent

UNITED STATES PATENTS

| Number | Name | Date |
|---|---|---|
| 2,378,746 | Beers | June 19, 1945 |
| 2,428,946 | Somers | Oct. 14, 1947 |
| 2,535,247 | White | Dec. 26, 1950 |
| 2,539,440 | Labin | Jan. 30, 1951 |
| 2,546,972 | Chatterjea | Apr. 3, 1951 |